United States Patent [19]

Takeda et al.

[11] Patent Number: 5,048,937
[45] Date of Patent: Sep. 17, 1991

[54] FARADAY ROTATOR DEVICE AND OPTICAL SWITCH CONTAINING SAME

[75] Inventors: Shigeru Takeda; Satoshi Makio, both of Kumagaya, Japan

[73] Assignee: Hitachi Metals, Ltd., Tokyo, Japan

[21] Appl. No.: 472,103

[22] Filed: Jan. 30, 1990

[30] Foreign Application Priority Data

Jan. 31, 1989 [JP] Japan ................................. 1-21828
Jan. 31, 1989 [JP] Japan ................................. 1-21829

[51] Int. Cl.⁵ .............................................. G02F 1/09
[52] U.S. Cl. .................................. 359/301; 333/24.1; 335/301; 359/484
[58] Field of Search ..................... 350/96.13, 375, 376, 350/377, 378; 333/24.1; 335/294, 301

[56] References Cited

U.S. PATENT DOCUMENTS

| | | | |
|---|---|---|---|
| 3,492,061 | 1/1970 | Dillon, Jr. et al. | 350/375 |
| 3,523,718 | 8/1970 | Crow | 350/375 |
| 3,626,335 | 12/1971 | Hord et al. | 333/24.1 |
| 3,982,213 | 9/1976 | Smith et al. | 333/24.1 |
| 4,042,831 | 8/1977 | Lenhoff, Jr. | 333/24.1 |
| 4,265,543 | 5/1981 | Barclay et al. | 350/375 |
| 4,467,292 | 8/1984 | Ajioka et al. | 333/24.1 |
| 4,564,824 | 1/1986 | Boyd, Jr. | 333/24.1 |
| 4,800,355 | 1/1989 | Takechi et al. | 335/301 |
| 4,926,430 | 5/1990 | Isono | 350/375 |

FOREIGN PATENT DOCUMENTS 63-144614 9/1988 Japan .
63-144615 9/1988 Japan .

OTHER PUBLICATIONS

Shirasaki et al., "Self Sustain Type Optical Switch for Single Mode Fiber," 1983 General Meeting of the Communication Association, 513-514, (partial translation).
Aoyama et al., "Optical Switch Comprising LPE-Grown GD-Doped YIG Thick Layer," 1983 General Meeting of the Communication Association, 2276, (partial translation).

Primary Examiner—Bruce Y. Arnold
Assistant Examiner—Martin Lerner

[57] ABSTRACT

A Faraday rotator device containing (a) a Faraday rotator, (b) a wire winding encircling the Faraday rotator for changing the magnetization state of the Faraday rotator, and (c) a hollow yoke surrounding the Faraday rotator and the wire winding for forming a substantially closed magnetic circuit together with the Faraday rotator, the hollow yoke having an opening in each of front and rear walls in alignment with the Faraday rotator for permitting a light to pass through the hollow yoke and the Faraday rotator. The optical switch containing a pair of polarizers disposed on front and rear sides of the Faraday rotator device, the magnetization direction of the Faraday rotator being reversible to change the optical path. The hollow yoke is made of a soft magnetic material or a semi-hard magnetic material.

15 Claims, 6 Drawing Sheets

FARADAY ROTATOR DEVICE AND OPTICAL SWITCH CONTAINING SAME

BACKGROUND OF THE INVENTION

The present invention relates to a Faraday rotator device capable of changing a polarized wave plane of a beam of light by changing current, and an optical switch comprising such a Faraday rotator device for switching the propagation direction of the light between two directions.

When a beam of light generated by a light source such as a semiconductor laser is caused to propagate through two optical fibers alternately, an optical switch as shown in FIG. 10 is conventionally used. In this optical switch, a prism 13 is mechanically moved back and forth to change the optical path of an incident light beam 5 from "a" to "b," and from "b" to "a." Herein 12a and 12b each respectively denote a total reflection prism. However, though a high extinction ratio is achieved in this apparatus, a mechanically movable portion (prism 13) is liable to be worn by a long period of use, leading to deviation in optical axis and thereby lowering the reliability of the apparatus.

To solve this problem, an optical switch as shown in FIG. 11 which utilizes a magneto-optic effect was proposed (Japanese Utility Model Publication Nos. 63-144614 and 63-144615).

This optical switch utilizes the principle of an optical isolator. By flowing a current through a wire winding 3 in one direction, a magnetic field 7a is generated, whereby a Faraday rotator 2 is magnetized. An incident light beam 5 passing through a first polarizer 6a goes into the Faraday rotator 2 in which the polarized wave plane of the light is rotated by 45°, and the light beam goes into a second polarizer 6b. Since the polarization direction of the second polarizer 6b is in alignment with the polarized wave plane of the light, the light beam can pass through it as shown by "a" in FIG. 11.

In this state, when the direction of the current is reversed, the magnetization direction of the Faraday rotator 2 is reversed to 7b, and the polarized wave plane of the incident light beam 5 becomes perpendicular to the polarization direction of the second polarizer 6b. Accordingly, the light beam cannot pass through the second polarizer 6b, and comes out in a perpendicular direction as shown by "b." By connecting an optical waveguide such as an optical fiber in this direction, the light beam can be caused to propagate in the other direction "b."

In this optical switch, the incident light beam 5 can be electromagnetically controlled in its propagation direction "a" or "b" by reversing the magnetization direction of the Faraday rotator 2.

However, in the conventional optical switch shown in FIG. 11 utilizing the function of an optical isolator, extremely high electric power is needed to reverse the magnetization direction of Faraday rotator 2, because the Faraday rotator device constitutes an open magnetic circuit.

Proposed as one method for solving this problem is a system utilizing a Faraday rotator 2 made of a thin YIG single crystal layer formed on a substrate 9 shown in FIG. 12 (1983 General Meeting of the Communications Association, 2276, and 1983 General Meeting of the Communications Association, S13-14). In the optical switch shown in FIG. 12, a magnetic yoke 1 having open ends is used, and a thin layer-type Faraday rotator 2 is disposed between the open ends of the magnetic yoke 1 to provide a substantially closed magnetic circuit. A wire winding 3 is wound around the ring-shaped magnetic yoke 1.

In this system, since the thin layer-type Faraday rotator 2 is used, the demagnetizing field is extremely small. Accordingly, the magnetization direction of the Faraday rotator 2 can be reversed with an extremely low magnetic field, namely with an extremely small current.

However, in this system, the beam diameter of the light which can be used is inherently limited due to the use of the thin layer, so that the applications of this system are inevitably limited.

Thus, in such conventional optical switches utilizing a magneto-optic effect, a high current is needed to reverse the magnetization direction of the Faraday rotator when a light having a large beam diameter is intended to be passed. In other words, when only a small current is used, a light having a large beam diameter cannot be passed.

OBJECT AND SUMMARY OF THE INVENTION

An object of the present invention is, therefore, to provide a Faraday rotator device utilizing a magneto-optic effect, which has a new magnetic circuit structure to solve the above problems.

Another object of the present invention is to provide an optical switch comprising such a Faraday rotator device.

The Faraday rotator device according to the present invention comprises (a) a Faraday rotator, (b) a wire winding encircling the Faraday rotator for changing the magnetization state of the Faraday rotator, and (c) a hollow yoke surrounding the Faraday rotator and the wire winding for forming a substantially closed magnetic circuit together with the Faraday rotator, the hollow yoke having an opening in each of front and rear walls in alignment with the Faraday rotator for permitting a light to pass through the hollow yoke and the Faraday rotator.

The optical switch according to the present invention includes a Faraday rotator device comprising (a) a Faraday rotator, (b) a wire winding encircling the Faraday rotator for changing the magnetization state of the Faraday rotator, and (c) a hollow yoke surrounding the Faraday rotator and the wire winding for forming a substantially closed magnetic circuit together with the Faraday rotator, the hollow yoke having an opening in each of front and rear walls in alignment with the Faraday rotator for permitting a light to pass through the hollow yoke and the Faraday rotator; and a pair of polarizers disposed on front and rear sides of the Faraday rotator device, the magnetization direction of the Faraday rotator being reversible to change the optical path.

In the above Faraday rotator device and optical switch, the hollow yoke is partially or totally made of a soft magnetic material or a semi-hard magnetic material.

DETAILED DESCRIPTION OF THE INVENTION

Figure 1:
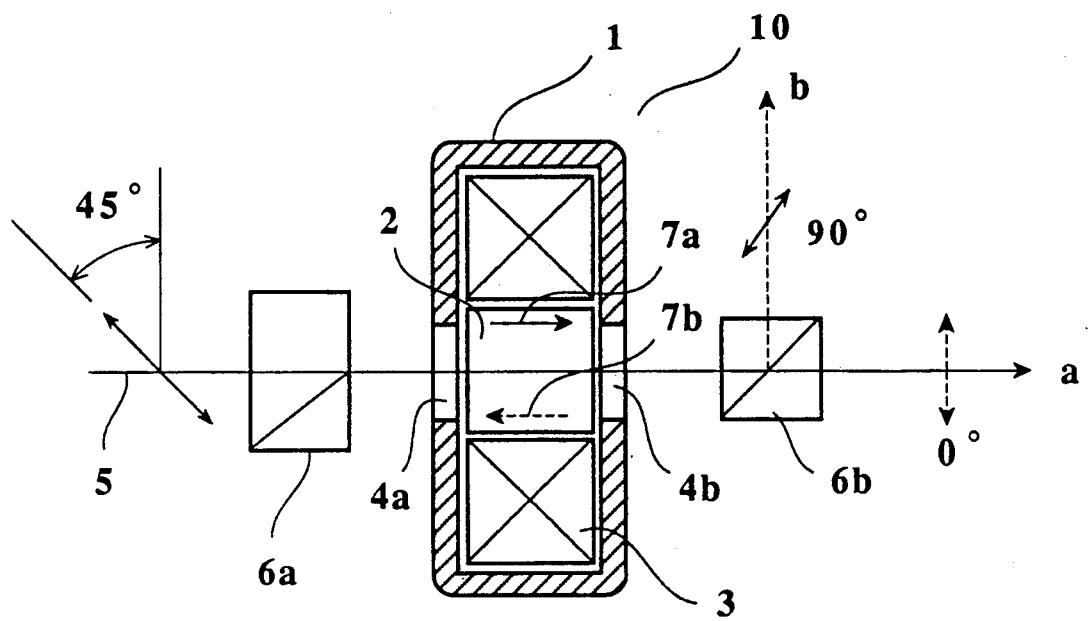
FIG. 1 is a schematic cross-sectional view showing an optical switch comprising a Faraday rotator device according to one embodiment of the present invention.

FIG. 1 shows the basic structure of the optical switch according to the present invention. In FIG. 1, the same reference numerals are assigned to the same parts as in FIG. 11. Two polarizers 6a, 6b are disposed on front and rear sides of a Faraday rotator device 10. The Faraday rotator device 10 comprises a Faraday rotator 2, a wire winding 3 encircling the Faraday rotator 2 for changing the magnetization state of the Faraday rotator 2, and a hollow yoke 1 surrounding the Faraday rotator 2 and the wire winding 3 for forming a substantially closed magnetic circuit together with the Faraday rotator 2. The hollow yoke 1 has an opening 4a, 4b in each of front and rear walls in alignment with the Faraday rotator 2 for permitting a light to pass through the hollow yoke 1 and the Faraday rotator 2. The wire winding 3 is connected to lead wires (14a, 14b in FIG. 2) which extend from the yoke 1, and the current is caused to flow through the wire winding 3 to control a magnetic field applied to the Faraday rotator 2. Accordingly, the magnetization direction of the Faraday rotator 2 can easily be reversed by changing the direction of this current.

The two polarizers 6a, 6b are at an angle of 45° relative to each other. In FIG. 1, the polarizer 6a is depicted such that it is rotated by 45° clockwise with respect to the optical path.

Figure 11:
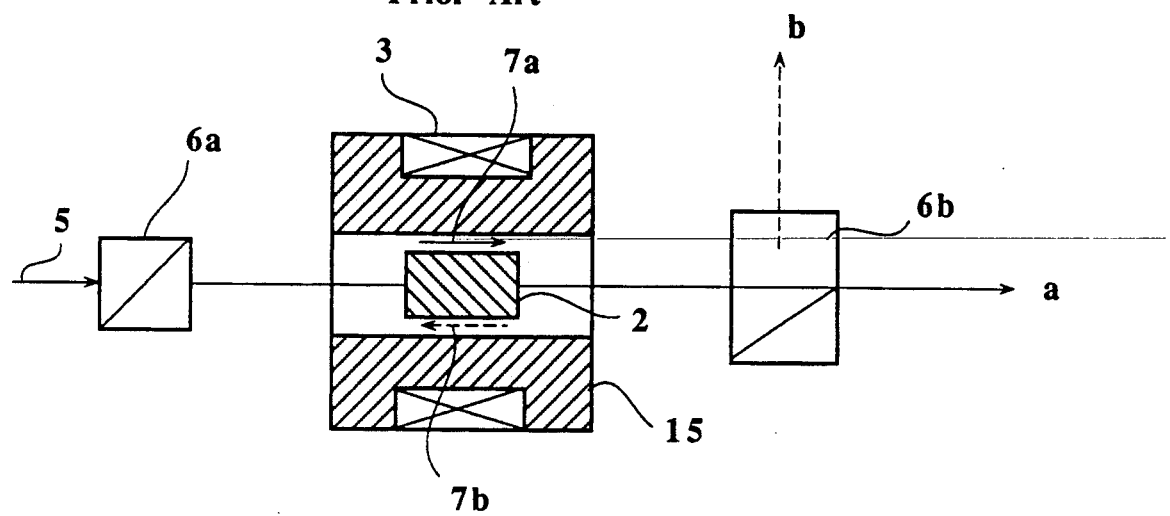
Figure 12:
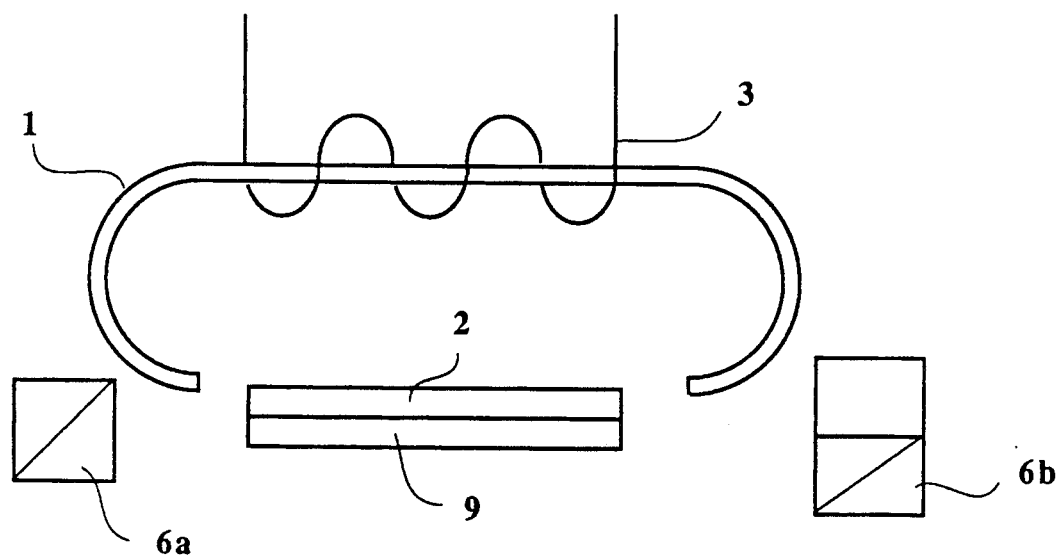

In this structure shown in FIG. 1, a substantially closed magnetic circuit is formed, and it shows much smaller magnetic resistance than the conventional structure shown in FIG. 11, meaning that the Faraday rotator device of the present invention can reverse the magnetization direction of the Faraday rotator 2 with much lower current.

In this case, for instance, when a magnetic field is in a direction 7a, an incident light 5 propagates in the direction "a," and when the magnetic field is directed as shown by 7b, the incident light beam 5 propagates in the direction "b."

There is an extremely close relation between the diameter of the Faraday rotator 2 and the diameter of the opening of the yoke 1, meaning that these diameters are important parameters affecting the intensity of the magnetic field applied to the Faraday rotator 2. A current necessary for saturating the Faraday rotator 2 is extremely small when the diameter of the Faraday rotator 2 is larger than the diameter of the opening 4a, 4b of the hollow yoke 1.

In the present invention, the yoke 1 may be made of a soft magnetic material or a semi-hard magnetic material. The soft magnetic materials include Permalloy, soft ferrite, etc., to increase the magnetic field applied to the Faraday rotator 2 with a small current.

The semi-hard magnetic material has a coercive force of about 2500 A/m or less and a relatively high magnetic flux density.

Typical examples of the semi-hard magnetic materials are as follows:

17% Ni-8% Al (Cu, Co)-bal. Fe,
10% V-50% Co-bal. Fe,
7% V-50% Co-bal. Fe,
4% V-50% Co-bal. Fe,
2% V-7.5% Cr- 52% Co-bal. Fe,
3% V-7% Cr- 52% Co-bal. Fe,
Cu (1–2%)-Ti (2–3%)-Mn (11–12%)-Fe (bal.),
10% Mn-20% Co-bal. Fe,
4% V-6% Ni-45% Co-bal. Fe,
0.3% Mn-0.9% C-3% Cr-bal. Fe,
0.8% C-15% Co-4.5% Cr-bal. Fe,
30% Co-15% Cr-bal. Fe,
30% Co-15% (Cr+V)-bal. Fe,
3% Al-15% Ni-1% Ti-bal. Fe,
3% Cu-16% Ni-bal. Fe,
12% Fe-Nb (3–5%)-bal. Co,
10% Fe-1.5% Be-bal. Co,
Cu (17–19%)-Mn (1.5–3%)-Fe (bal.), and
Fe-Cu-Mo.

When the yoke 1 is made of a semi-hard magnetic material, the magnetization state of the Faraday rotator 2 can be stably maintained without continuously flowing the current through the wire winding 3, whereby the polarized wave plane of a light can be maintained at either one of the two angles.

In the Faraday rotator device having this structure, the polarized wave plane of the light can be changed by changing the magnetic field applied to the Faraday rotator 2. And by applying a magnetic field larger than the saturation magnetization of the Faraday rotator 2 in different directions (forward and rearward directions), the Faraday rotator device can be used as an optical switch.

When the optical switch is to be operated at a high frequency, the yoke is preferably made of a soft magnetic material such as soft ferrite with small loss. On the other hand, when the optical switch is operated in a semi-stable condition, the yoke may be made of a semi-hard magnetic material.

In connection with the above Faraday rotator device, only the yoke 1, the Faraday rotator 2, and the wire winding 3 are shown, but a bobbin, etc. may be added to hold the wire winding 3, and a support member for fixing the positions of the yoke 1, the Faraday rotator 2, and the wire winding 3 may be added.

In the case of the optical switch, a polarizer which may be used includes a beam splitter, and other double refraction prisms such as a Glan-Thompson prism, a wedge-shaped prism, etc.

The present invention will be further described in detail by means of the following Examples.

EXAMPLE 1

In the optical switch having the structure shown in FIG. 1, the polarizers 6a, 6b are beam splitters. The Faraday rotator 2 is a YIG cylindrical body through which an incident light 5 passes. A wire winding 3 is wound around the Faraday rotator 2 to apply a magnetic field thereto. A hollow yoke 1 surrounding the Faraday rotator 2 and the wire winding 3 is made of soft ferrite, and has a pair of openings 4a, 4b in front and rear side walls. The rotation angle of the Faraday rotator 2 is 45° at saturation.

Current necessary for reversing the magnetic field of this optical switch was 1 A or less.

On the contrary, in a conventional optical switch having a wire winding 3 wound around a holder 15 as shown in FIG. 11, 10 A of current were needed to generate a magnetic field necessary for saturating the same Faraday rotator 2 as in this Example. Accordingly, it is clear that the Faraday rotator device of the present invention is superior to the conventional one.

EXAMPLE 2

In the optical switch having a structure shown in FIG. 1, the polarizers 6a, 6b are beam splitters. The Faraday rotator 2 is a YIG cylindrical body through which an incident light beam 5 passes. A wire winding 3 is wound around the Faraday rotator 2 to apply a magnetic field to the yoke 1 and to the Faraday rotator 2. A hollow yoke 1 surrounding the Faraday rotator 2 and the wire winding 3 is made of an Fe-Cr-Co semi-hard magnetic material, and has a pair of openings 4a, 4b in front and rear side walls. The rotation angle of the Faraday rotator 2 is 45° at saturation.

Figure 2:
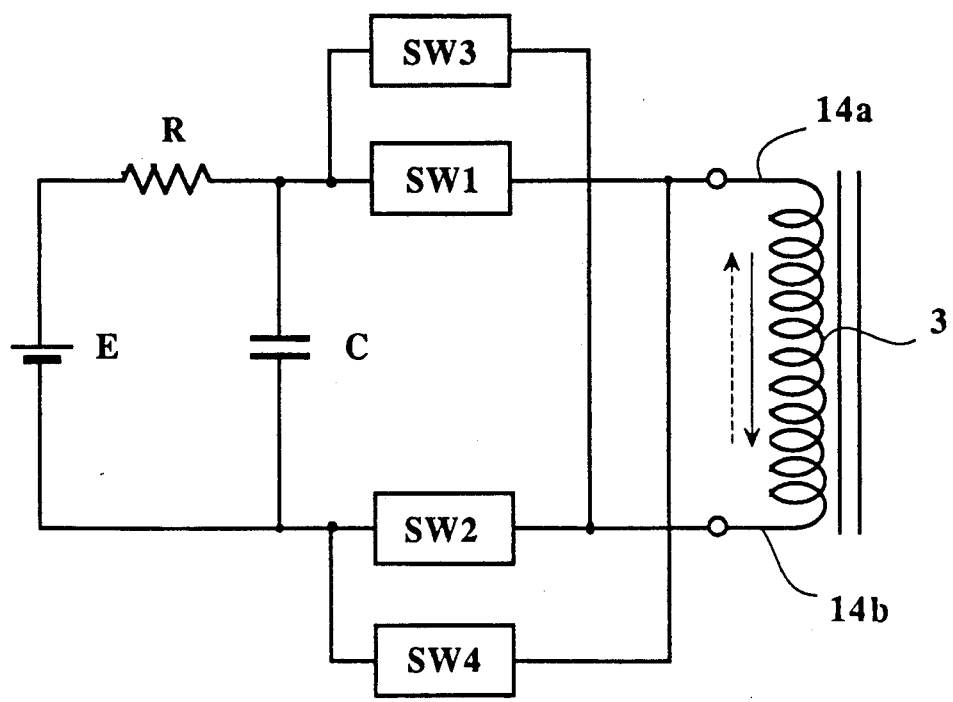
FIG. 2 is a schematic view showing an example of a power supply circuit which can be used in the present invention.

The lead wires 14a, 14b of the wire winding 3 extend from the yoke 1 and are connected to the circuit shown in FIG. 2. In an initial state, since the switches $SW_1$, $SW_2$, $SW_3$ and $SW_4$ are "OFF," charge supplied from a power supply E via a resistor R is stored in a capacitor C (20 μF). In a state where the capacitor C is fully charged, the switches $SW_1$ and $SW_2$ are turned on to cause a discharge current having a high peak to flow through the wire winding 3 in a forward direction shown by the solid line. When the discharge of the capacitor C has been substantially completed, the switches $SW_1$ and $SW_2$ are turned off again. In this state, the yoke 1 made of an Fe-Cr-Co semi-hard magnetic material is magnetized in one direction (shown by 7a in FIG. 1), whereby the Faraday rotator 2 is stably magnetized in one direction. Thus, the light propagates in the direction "a" in FIG. 1.

Figure 3:
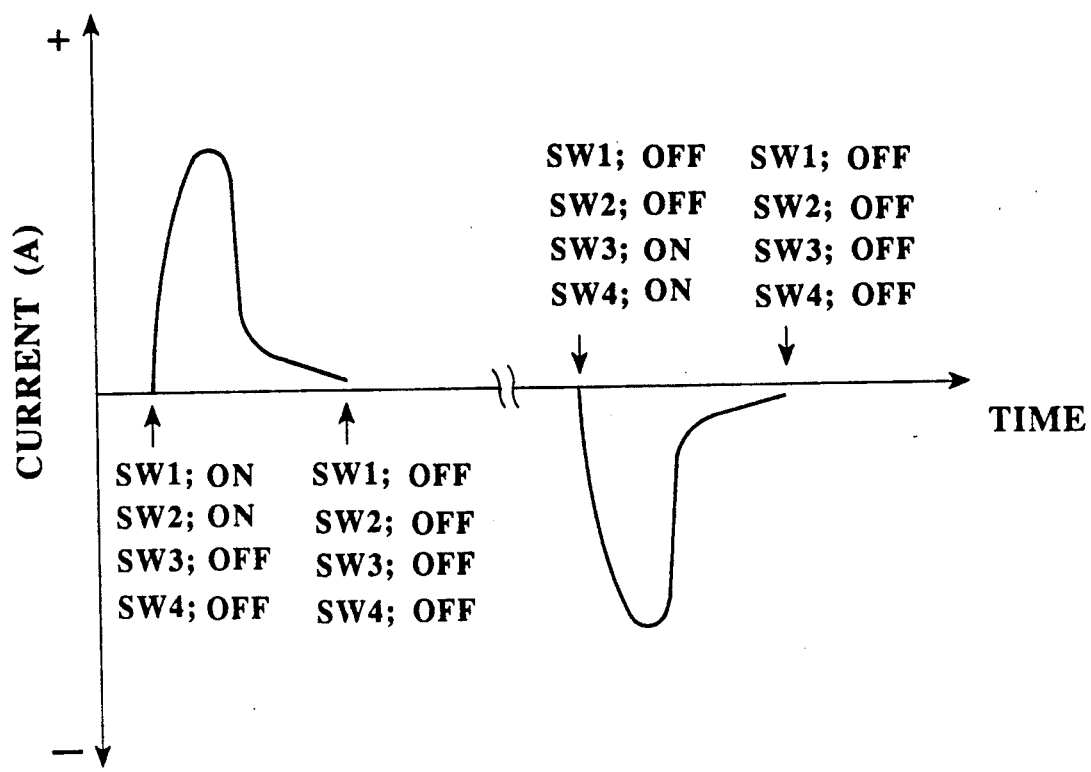
FIG. 3 is a schematic view showing discharge current supplied from the power supply circuit of FIG. 2.

To switch the propagation direction of the light from "a" to "b," the switches $SW_3$ and $SW_4$ are simultaneously turned on in the circuit of FIG. 2. In this case, since the discharge current flows in the opposite direction shown by the broken line in FIG. 2, the yoke 1 made of a semi-hard magnetic material and the Faraday rotator 2 are magnetized oppositely. Thus, the light propagates in the direction "b" in FIG. 1. Incidentally, FIG. 3 shows the discharge current which flows by turning on or off each pair of switches in FIG. 2.

In this Example, a stable magnetization state of the Faraday rotator 2 can be achieved without continuously flowing the current through the wire winding 3.

As is clear from the comparison of the Faraday rotator device of the present invention shown in FIG. 1 (comprising the yoke made of an Fe-Cr-Co semi-hard magnetic material) with the conventional Faraday rotator device shown in FIG. 11, the Faraday rotator device of the present invention shows much smaller magnetic resistance than the conventional counterpart. Therefore, in the Faraday rotator device of the present invention, a lower current is sufficient to reverse the magnetization direction of the Faraday rotator 2.

As a result of experiments, about 10 A of current was continuously needed to keep the magnetization direction of the Faraday rotator in the conventional Faraday rotator device, while in the Faraday rotator device of the present invention (comprising the yoke made of an Fe-Cr-Co semi-hard magnetic material) the magnetization direction of the Faraday rotator was reversed with discharge current showing a peak value of 5 A or less and a pulse width of 500 msec or less at voltage of 50 V. In addition, to maintain the stable magnetization state of the Faraday rotator, it is not necessary to continuously flow the current.

EXAMPLE 3

Figure 4:
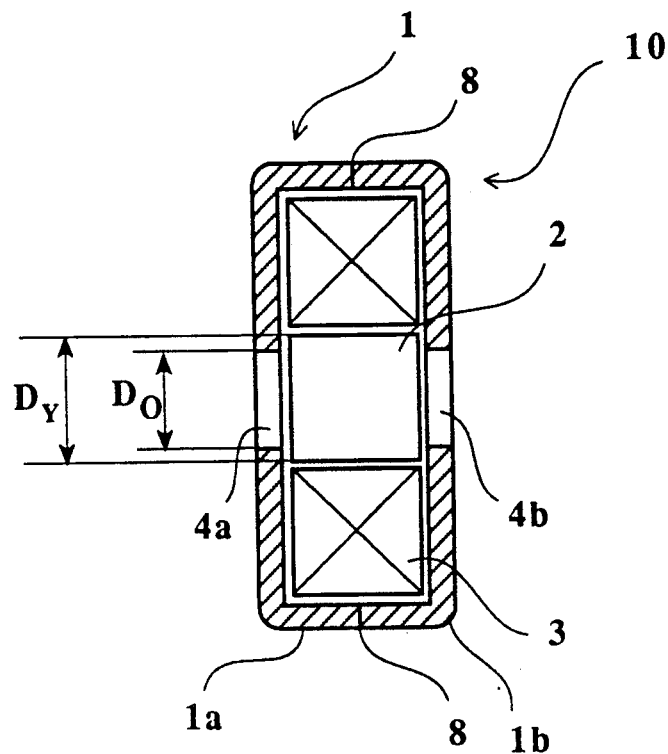
FIG. 4 is a schematic cross-sectional view showing the Faraday rotator device of the present invention for showing the relation between $D_O$ and $D_Y$.

A Faraday rotator device shown in FIG. 4 was produced. In this Faraday rotator device, the Faraday rotator 2 and the wire winding 3 are substantially the same as in Example 1, and the yoke 1 made of soft ferrite is constituted by two portions 1a, 1b with split surfaces 8 to facilitate the assembling of the yoke 1, the Faraday rotator 2 and the wire winding 3.

With this Faraday rotator device, current necessary for saturating the Faraday rotator 2 was measured while changing the ratio of the diameter $D_O$ of the inlet and the outlet openings 4a, 4b of the yoke 1 to the diameter $D_Y$ of the Faraday rotator 2. The results are shown in FIG. 5.

Figure 5:
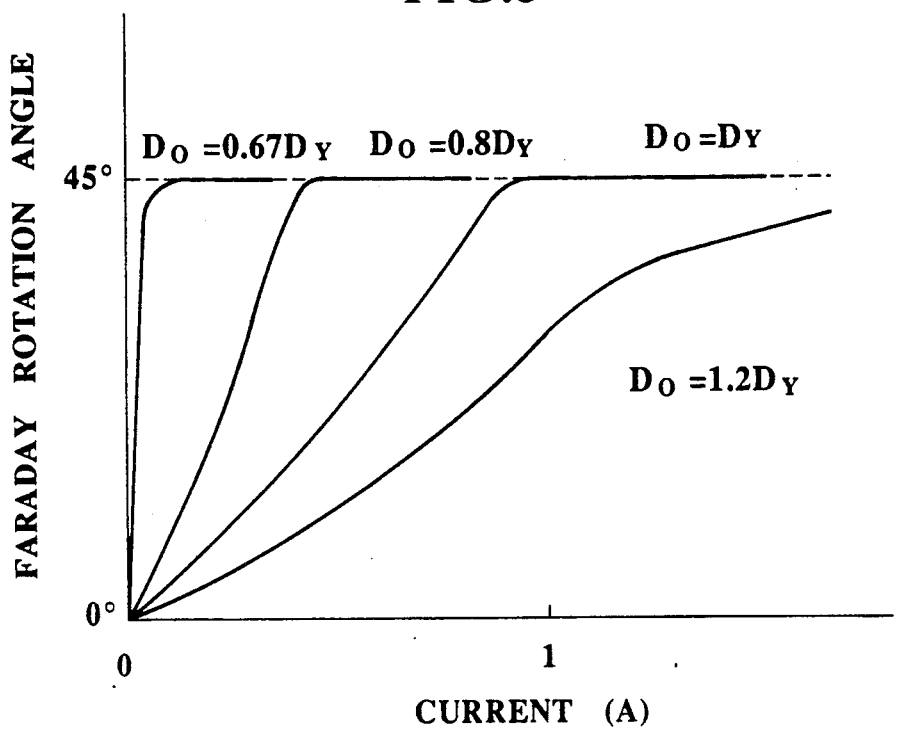
FIG. 5 is a graph showing the influence of the sizes of openings of the yoke and the Faraday rotator on Faraday rotation angle in the Faraday rotator device of the present invention comprising a hollow yoke made of a soft magnetic material.

As is clear from FIG. 5, when $D_O$ is larger than $D_Y$, the saturation current is considerably high, namely 2 A or more. On the other hand, when $D_O$ is equal to or smaller than $D_Y$, the saturation current is considerably low, namely lower than 1 A.

Incidentally, the Faraday rotator 2 is in the shape of a cylinder in this Example, but this Faraday rotator 2 may have any cross section such as a rectangular or polygonal cross section to provide the same effects. In addition, the yoke 1 may have openings of any shapes. In these cases, the relations between $D_O$ and $D_Y$ shown in FIG. 5 are applicable, assuming that $D_O$ denotes a minimum size of the openings 4a, 4b of the yoke 1, and $D_Y$ denotes a maximum size of the Faraday rotator 2 taken perpendicular to the optical path.

In this Example, two portions 1a, 1b of the yoke 1 are divided along split surfaces 8 perpendicular to the optical path, but the hollow yoke 1 may be split in a direction parallel to the optical path.

EXAMPLE 4

The same optical switch as in Example 1 was produced such that the relation: $D_O = 0.8 D_Y$ was satisfied, and the relations of the wavelength of an incident light 5 and an extinction ratio and an insertion loss were measured. The results are shown in FIG. 6.

Figure 6:
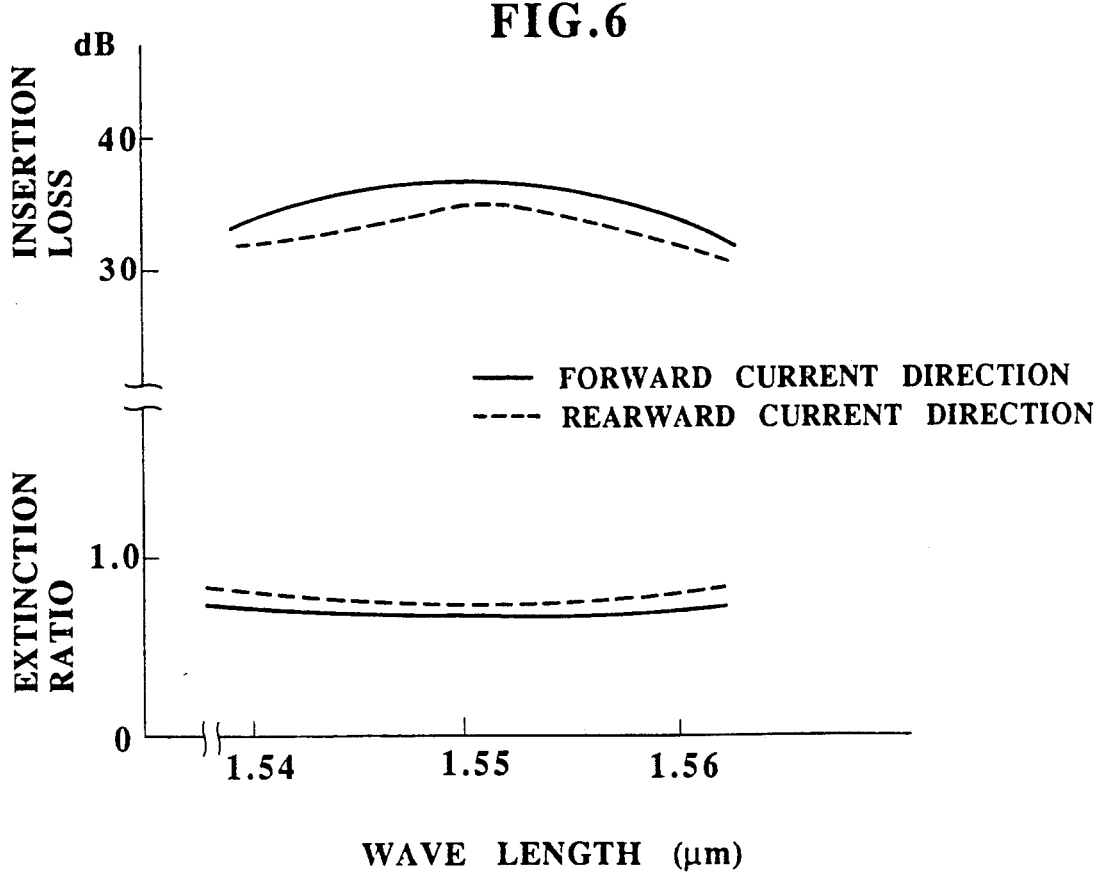
FIG. 6 is a graph showing the relations between an extinction ratio and an insertion loss of the Faraday rotator device of the present invention and a wavelength of a light.

In FIG. 6, a solid line denotes a forward direction of current (corresponding to a magnetic field 7a in FIG. 1), and a broken line denotes a rearward direction (corresponding to a magnetic field 7b in FIG. 1). The incident light 5 had a wavelength of about 1.55 μm for simulation of a semiconductor laser.

As shown in FIG. 6, the insertion loss was smaller than 1 dB in both directions, and a leakage light in an undersirable propagation direction was attenuated by more than 30 dB. Therefore, this optical switch shows excellent performance.

EXAMPLE 5

The same Faraday rotator device as in Example 3 except that the yoke was made of an Fe-Cr-Co semi-hard magnetic material was produced.

With this Faraday rotator device, current necessary for saturating the Faraday rotator 2 was measured while changing the ratio of the diameter $D_O$ of the inlet and outlet openings 4a, 4b of the yoke 1 to the diameter $D_Y$ of the Faraday rotator 2. The results are shown in FIG. 7.

Figure 7:
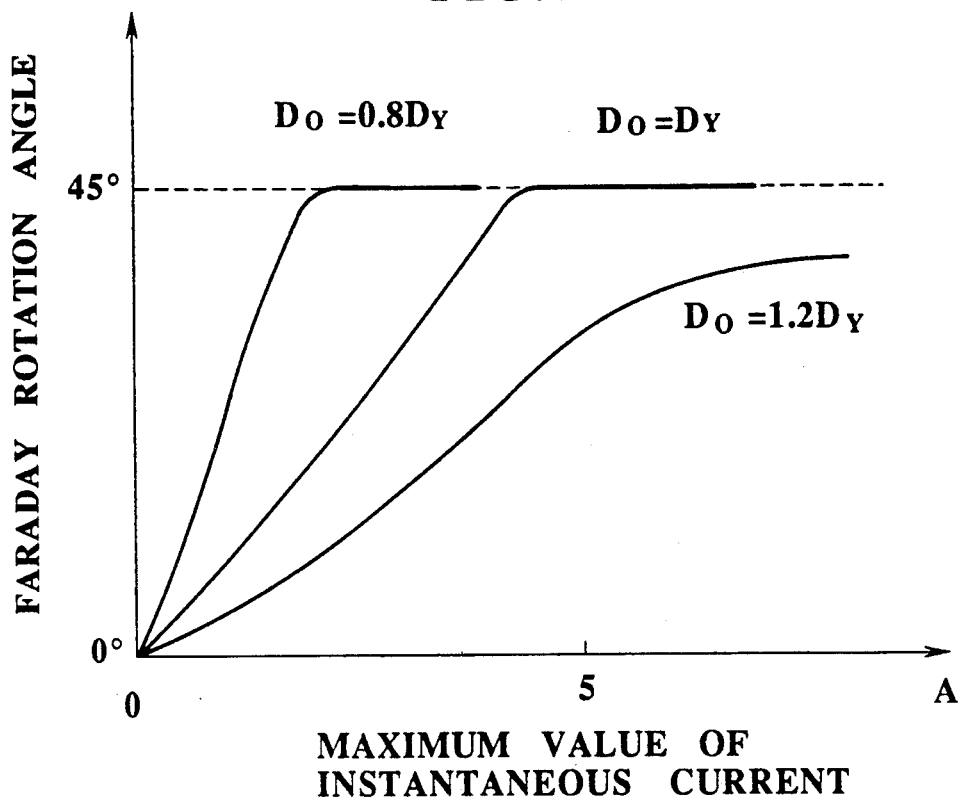
FIG. 7 is a graph showing the influence of the sizes of openings of the yoke and the Faraday rotator on Faraday rotation angle in the Faraday rotator device of the present invention comprising a hollow yoke made of a semi-hard magnetic material.

As is clear from FIG. 7, when $D_O$ is larger than $D_Y$, the saturation current is considerably high, such as 5 A or more at maximum. On the other hand, when $D_O$ is equal to or smaller than $D_Y$, the saturation current is much lower than 5 A at maximum.

EXAMPLE 6

The same optical switch as in Example 2 was produced such that the relation: $D_O = 0.8 D_Y$ was satisfied, and the relations of the wavelength of an incident light beam 5 and an extinction ratio and an insertion loss were measured. As a result, substantially the same results as in Example 4 are obtained.

EXAMPLE 7

Figure 8:
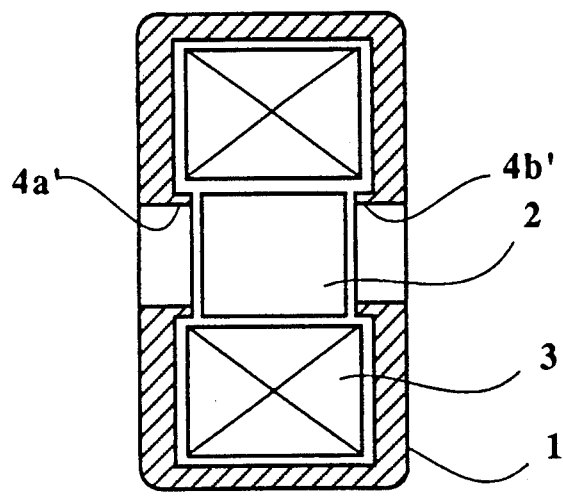
FIG. 8 is a schematic cross-sectional view showing a Faraday rotator device according to another embodiment of the present invention.

The Faraday rotator device of this Example is shown in FIG. 8. When the incident light has a relatively large beam diameter, the Faraday rotator 2 should have a large diameter, leading to a larger demagnetization coefficient. Accordingly, a high current should be flowed. In this case, as shown in FIG. 8, an annular projection 4a', 4b' is disposed in an inner surface of an opening provided in each side wall to increase the volume of the wire winding 3.

EXAMPLE 8

Figure 9:
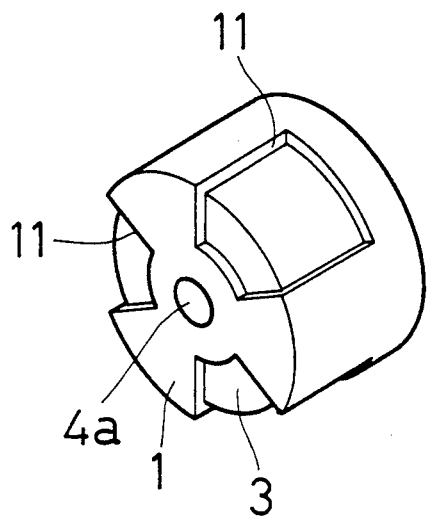
FIG. 9 is a perspective view showing a Faraday rotator device according to a further embodiment of the present invention.
Figure 10:
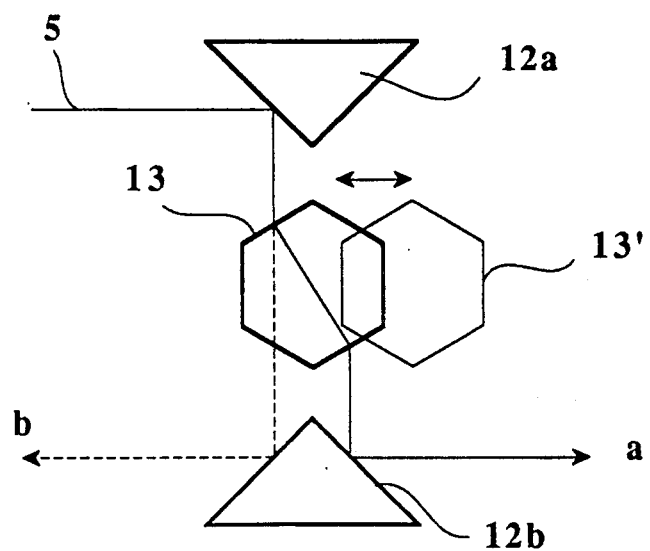
FIGS. 10-12 are schematic views showing conventional optical switches.

The Faraday rotator device of this Example is shown in FIG. 9. In this Faraday rotator device, a hollow yoke 1 has a plurality of notches 11 on a circumferential portion. By these notches 11, the temperature increase of the wire winding 3 through which current flows continuously can be somewhat suppressed by the cooling effect of flowing air. Further, the notches 11 can be provided such that the yoke 1 shows substantially the same magnetic resistance in its circumferential portion and in a portion near the opening 4a, 4b, thereby minimizing the magnetic flux leaking from the surface of the yoke 1.

In this Example, the yoke 1 may be divided into a plurality of portions, some of which are made of a semi-hard magnetic material. Particularly, it is effective that only the inward annular projections 10 of the yoke 1 are made of a semi-hard magnetic material.

In the above Examples, the Faraday rotator was made of YIG single crystals. However, other materials such as Bi-substituted LPE (liquid phase epitaxial) layers may be used. However, since the LPE layer is extremely thin, a sufficient space for the wire winding cannot be provided, and even though enough space is provided, there may be a large gap between the central portion of the yoke and the LPE layer, resulting in large magnetic resistance.

As described above in detail, the Faraday rotator device of the present invention has a high reliability and is operable at low electric power. When this Faraday rotator device has a hollow yoke made of a soft magnetic material, it can provide a high-performance optical switch operable at a high frequency. On the other hand, when the yoke is made of a semi-hard magnetic material, the magnetization state of the Faraday rotator can be stably maintained without continuously flowing the current through the wire winding. Such a Faraday rotator device is effective particularly for an optical switch operable at a relatively lower low frequency.

What is claimed is:

1. A Faraday rotator device comprising:
   (a) a Faraday rotator;
   (b) a wire winding encircling said Faraday rotator for changing the magnetization state of said Faraday rotator; and
   (c) a hollow yoke having a body portion having an inner diameter larger than an outer diameter of said Faraday rotator and front and rear walls each having an opening having a smaller diameter than the outer diameter of said Faraday rotator, said yoke surrounding said Faraday rotator and said wire winding for forming a substantially closed magnetic circuit together with said Faraday rotator, said openings of said hollow yoke being in alignment with said Faraday rotator for permitting a light beam to pass through said hollow yoke and said Faraday rotator.

2. The Faraday rotator device according to claim 1, wherein said hollow yoke is made of a soft magnetic material.

3. The Faraday rotator device according to claim 2, wherein part or all of said hollow yoke is made of soft ferrite.

4. The Faraday rotator device according to claim 1, wherein said hollow yoke is partially or totally made of a semi-hard magnetic material.

5. The Faraday rotator device according to claim 1, wherein said hollow yoke is an assembly of two or more portions.

6. The Faraday rotator device according to claim 1, wherein said hollow yoke includes notch means for exposing said wire winding for cooling.

7. The Faraday rotator device as in claim 6 wherein said notch means include at least one notch circumferentially configured to provide a more uniform magnetic resistance through said yoke.

8. The Faraday rotator device according to claim 1, wherein said Faraday rotator is made of a garnet-type ferrite single crystal consisting essentially of YIG ($Y_3Fe_5O_{12}$).

9. The Faraday rotator device as in claim 1 wherein the axial inner dimension of said yoke is greater than the axial length of said Faraday rotator to accommodate said wire winding, and wherein at least one of said front and rear yoke walls includes an axial inward yoke projection proximate said respective opening.

10. The Faraday rotator device as in claim 9 wherein each of said front and rear walls includes a projection, and wherein each projection extends adjacent to a respective axial face of said Faraday rotator.

11. An optical switch comprising a Faraday rotator device having (a) a Faraday rotator, (b) a wire winding encircling said Faraday rotator for changing the magnetization state of said Faraday rotator, (c) a hollow yoke having a body portion having an inner diameter larger than an outer diameter of said Faraday rotator and front and rear walls each having an opening of a smaller diameter than the outer diameter of said Faraday rotator, said yoke surrounding said Faraday rotator and said wire winding for forming a substantially closed magnetic circuit together with said Faraday rotator, said openings of said hollow yoke being in alignment with said Faraday rotator for permitting a light beam to pass through said hollow yoke and said Faraday rotator; a pair of polarizers disposed on front and rear sides of said Faraday rotator device; and means for reversing the magnetization direction of said Faraday rotator to change the optical path.

12. The optical switch according to claim 11, wherein said hollow yoke is made of a soft magnetic material.

13. The optical switch according to claim 12, further including circuit means for causing current to continuously flow through said wire winding in a forward or rearward direction, thereby stably keeping said Faraday rotator at one of two magnetization states.

14. The optical switch according to claim 11, wherein said hollow yoke is partially or totally made of a semi-hard magnetic material.

15. The optical switch according to claim 14, further including circuit means for causing current to flow through said wire winding in a forward or rearward direction for a limited period of time, thereby stably keeping said Faraday rotator at one of two magnetization states.

* * * * *